United States Patent

[11] 3,540,423

| [72] | Inventor | Edward D. Tolles III,<br>Charleston, South Carolina |
|---|---|---|
| [21] | Appl. No. | 791,939 |
| [22] | Filed | Jan. 17, 1969 |
| [45] | Patented | Nov. 17, 1970 |
| [73] | Assignee | Westvaco Corporation<br>New York, New York<br>a corporation of Delaware |

[54] EVAPORATIVE EMISSION CONTROL SYSTEM
15 Claims, 4 Drawing Figs.

[52] U.S. Cl. .................................................. 123/136,
123/120
[51] Int. Cl. ..................................................... F02d 19/00
[50] Field of Search ........................................... 123/119,
120, 121, 122D, 122H, 124, 136

[56] References Cited
UNITED STATES PATENTS

| 2,315,882 | 4/1943 | Trimble et al. | 123/121 |
| 3,001,519 | 9/1961 | Dietrich et al. | 123/136 |
| 3,003,488 | 10/1961 | Carlson | 123/127 |
| 3,172,348 | 3/1965 | Berg | 123/136X |
| 3,221,724 | 12/1965 | Wentworth | 123/136 |
| 3,368,326 | 2/1968 | Hervert | 123/136X |
| 3,450,119 | 6/1969 | Sendelbach | 123/122D |
| 3,460,522 | 8/1969 | Kittler et al. | 123/136 |

Primary Examiner—Laurence M. Goodridge
Attorney—Alfred L. Michaelsen and Robert S. Grimshaw ABSTRACT: Disclosed is a system for controlling the emission to the atmosphere of fuel vapors from an internal combustion engine fuel system wherein the emission arises from the evaporation of the fuel. The system is comprised of a dual combustion air inlet to the carburetor, Viz. a primary and secondary combustion air inlet. A fuel vapor adsorbent or absorbent material is located in the primary air inlet. When the engine is not operating or is idling, means are provided for venting evaporative fuel vapors to the adsorbing or absorbing bed during which time the primary combustion air inlet is closed. When the engine is operating at relatively high air consumption, evaporative fuel vapors from the carburetor fuel bowl may be vented internally. When the primary air inlet is opened, the combustion air flowing therethrough thereby regenerates the adsorption or absorption bed.

Patented Nov. 17, 1970

INVENTOR.
EDWARD D. TOLLES, III

BY Alfred L. Michaelen

AGENT

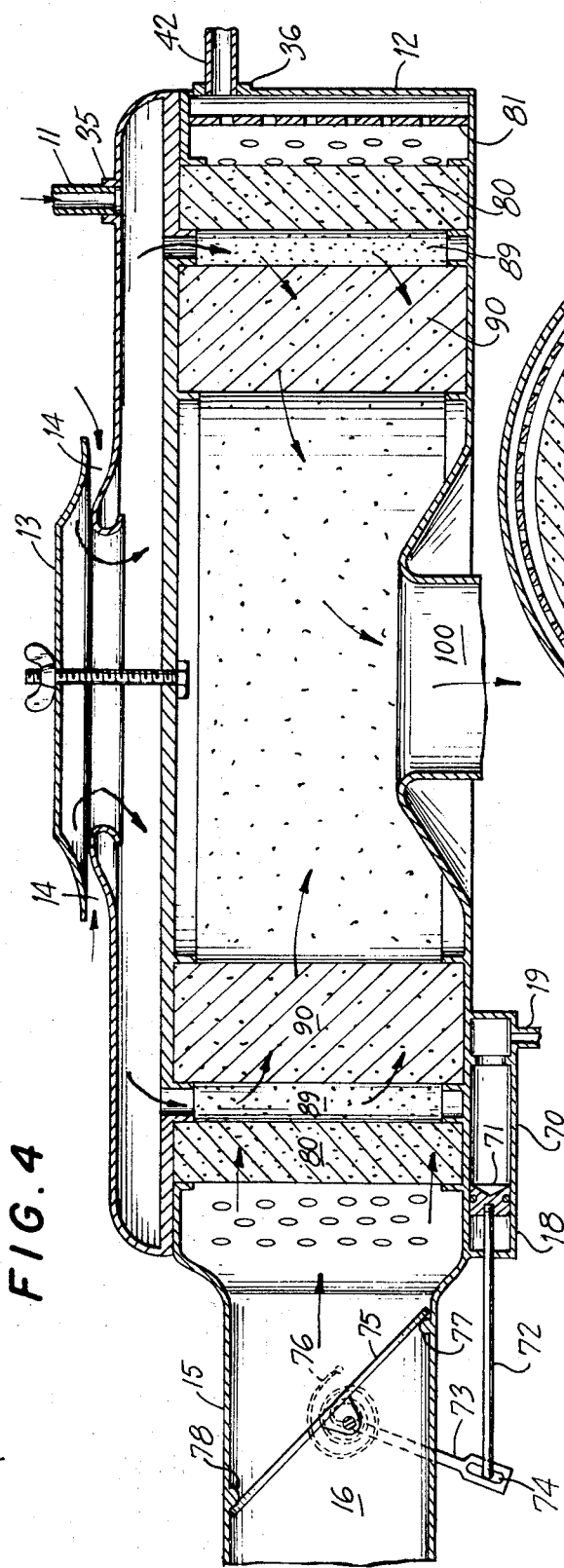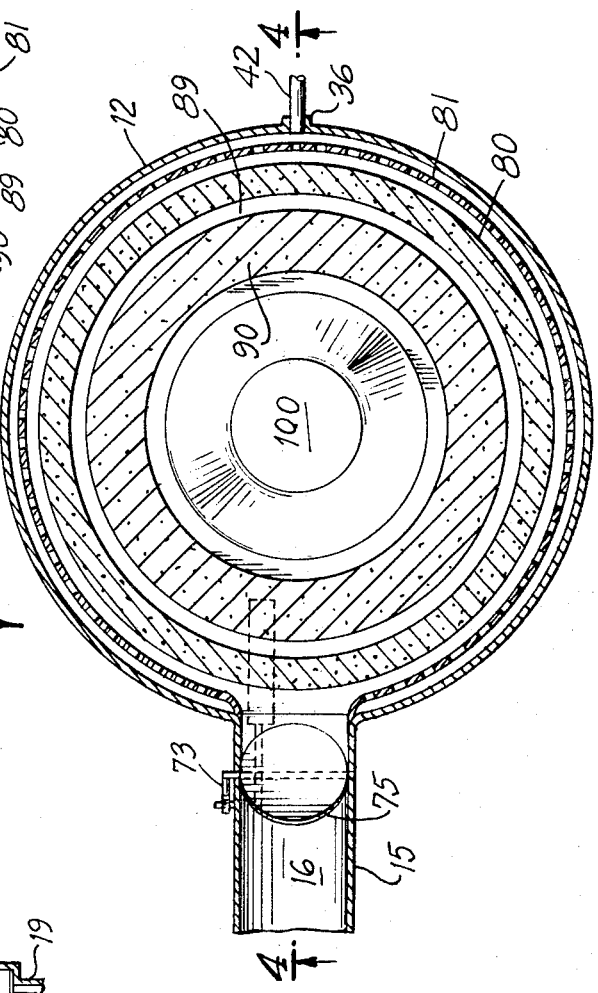
FIG.4
FIG.3
INVENTOR.
EDWARD D. TOLLES, III

EVAPORATIVE EMISSION CONTROL SYSTEM

BACKGROUND OF THE INVENTION

1. Field of the Invention

It has been well recognized by those concerned with air pollution that a major factor contributing to the pollution of our air is the fuel vapors emitted from automobiles due to evaporation of the fuel which, in the vast majority of cases is gasoline. This source of air pollution is not to be confused with air pollution which arises from the emission by automobiles of combustion products. The invention described herein pertains only to the former source of air pollution and more particularly to a system which substantially eliminates this source.

The prior art pertaining to the control of evaporative emission of fuel vapors has recognized that the above described source of air pollution has, essentially, two origins within the typical internal combustion engine system, that is, from the carburetor fuel bowl and from the fuel tank. Evaporative emission from the fuel bowl occurs principally when an engine which has attained operating temperature is shut off. In this so called "hot soak" condition, cooling air is no longer circulated around the carburetor, and since it is confined beneath the hood of the automobile above the hot engine, the temperature within the bowl rises dramatically, and a portion of the fuel contained therein evaporates. Although the amount of fuel that evaporates in this manner may often be less than half of that evaporated from the fuel tank, the high bowl temperatures cause fuel components to evaporate from this source which are much more chemically reactive in smog formation reactions than an equal weight of hydrocarbons emitted from the fuel tank. It is for this reason that control of fuel bowl emissions is important.

Evaporative emissions from the fuel tank can occur when temperature variations cause expansion and contraction of the gas and vapor phase in the space above the fuel contained therein. During expansion, hydrocarbon laden air escapes into the atmosphere from an uncontrolled vehicle. Thus even when a vehicle is not being operated, the daily temperature cycle or "dinural cycle" is responsible for this type of emission. Further losses may be encountered when the vehicle is operating under high ambient temperature conditions or when the fuel is heated by nearby exhaust system components. Although the temperatures to which fuel in the tank is subjected are much lower than those encountered by fuel in the carburetor fuel bowl, the relatively large volume and surface area of fuel in the tank contribute to the evaporation of considerable amounts of fuel.

Aware of the foregoing, the prior art has conceived of numerous possible methods and apparatus arrangements to control evaporative emission.

However, mere control of evaporative emission, in and of itself, is unsatisfactory if, in the course of employing such control means engine operation is impaired. Thus, the ideal evaporative emission control system would not only effectively control evaporative emissions under all engine operating conditions, but, as well, would have no adverse affects upon engine operation. While, to one extent or another, all the prior art systems have failed to achieve this object, it will be apparent to those skilled in the art, after reading the following description of my invention, that the apparatus for which I seek Letters Patent not only successfully achieves control of evaporative emissions but, in the course of achieving this objective, does not substantially impair engine operation.

2. Description of the Prior Art

Early in the prior art it was recognized that an appropriate mechanism for controlling evaporative emissions would be to have an adsorbent or absorbent material through which fuel vapors resulting from evaporation would be vented. Of course, as the vapors passed through the adsorbent material they would be adsorbed thereon and thus would not escape to the atmosphere. As a result, early prior art systems located an adsorbent bed within the engine environment and by means of conduits or other fluid communication means allowed the carburetor fuel bowl and fuel tank to vent to the atmosphere through an adsorbent bed.

However, soon after the advent of this procedure, it was realized that unless the adsorbent bed was periodically regenerated, it would have to be of a prohibitively large size and/or replaced at frequent intervals. Thus, various methods were developed for regenerating the adsorbent bed, all of which were based upon the expedient of periodically passing a stream of clean air through the material thereby desorbing the fuel deposited thereon. The general method by which the prior art effected this desorption or regeneration process was to so locate the adsorbent bed or beds such that at least a portion of the air inducted into the engine for combustion was passed through and over the adsorbent bed. This result was achieved by either placing the adsorbent bed directly in the combustion air inlet or, through the use of appropriate conduits and valves, interconnecting the fuel tank and the carburetor fuel bowl to the adsorbent bed(s) and the adsorbent bed(s) to the air intake. In this manner, when the engine was not operating, fuel vapors resulting from evaporation of the fuel in either the carburetor fuel bowl or the fuel tank were conducted to and through the adsorbent bed(s). Alternatively, when the engine was operating, intake air was conducted through the adsorbent bed(s) thereby effecting regeneration. In addition, the more advanced of the prior art systems provided means whereby the carburetor fuel bowl would be vented internally, i.e. to the carburetor throat, when the engine was running and externally, i.e. through an adsorbent bed, when the engine was not operating.

From the foregoing remarks, it will be appreciated that the prior art, in attempting to solve the general problem of controlling evaporative emissions was, of necessity, endeavoring to satisfy the following criteria. First, the adsorption system should be of sufficient capacity to adsorb and retain the vapors from the carburetor fuel bowl during the hot soak period as well as fuel evaporating from either the fuel tank or the carburetor fuel bowl as a result of high ambient temperatures or because of the normal diurnal temperature cycle. Second, the means of regeneration provided should be such that regeneration is completed in a relatively short time period. Third, the desorption or regeneration process should not adversely affect engine operation by altering the air/fuel ratio which would increase exhaust hydrocarbon and carbon monoxide emissions during low speed modes of operation. Fourth, the evaporative emission control system should not affect vehicle drivability by, for example, causing an overrich mixture during hot starting.

SUMMARY OF THE INVENTION

An internal combustion engine which includes a carburetor having a fuel bowl is provided with a system for controlling the evaporative emissions of fuel vapor. The system includes two combustion air inlets to the carburetor, viz. a primary and secondary inlet. Located in the primary air inlet is a valve which is closed when the engine is shut off or is running at low air consumption. Also in the primary air inlet, but downstream of the aforementioned valve, is an adsorbent or absorbent bed, it being understood that hereinafter reference to an adsorbent material includes an absorbent material. Unlike the primary air inlet, the secondary air inlet is always open and, although restricted, permits a sufficient flow of combustion air to the engine when it is being started or is idling. At increased engine air consumption, air is supplied through both the primary and the secondary air inlet. The primary air flow, which occurs only at high engine air consumption rates, regenerates the adsorption bed by desorption.

A conduit is provided from the top of the carburetor fuel bowl to the inlet side of a two-way valve which is actuated in response to engine air consumption. When engine air consumption is low, the first outlet port is open. When engine air consumption is high, the second outlet port is open. A conduit is provided from the first outlet port to the primary air inlet at a point intermediate the adsorption bed and the valve in the primary air inlet. Another conduit is provided from the second outlet port to an internal carburetor vent.

As an alternate, other means may be employed to obtain two-way valve action, such as dual conduits from the carburetor fuel bowl, each having a check valve responsive to engine air consumption.

Still another alternative would be to have a single, uninterrupted conduit from the top of the fuel bowl directly to the primary air inlet intermediate the primary air valve and the adsorption bed. With this approach, which differs from my preferred embodiment, the carburetor fuel bowl would always be vented externally to the adsorption bed.

Additionally, with any of these alternatives, a conduit may be provided from the top or vapor side of the fuel tank to the primary air inlet, once again at a point intermediate the adsorption bed and the valve in the primary air inlet.

DESCRIPTION OF THE DRAWINGS

FIG. 3 is a sectional plan view taken about the section line 3-3 of FIG. 1.

4 is a sectional side elevation taken about the section line 4-4 of FIG. 3.

DESCRIPTION OF THE INVENTION

Figure 1:
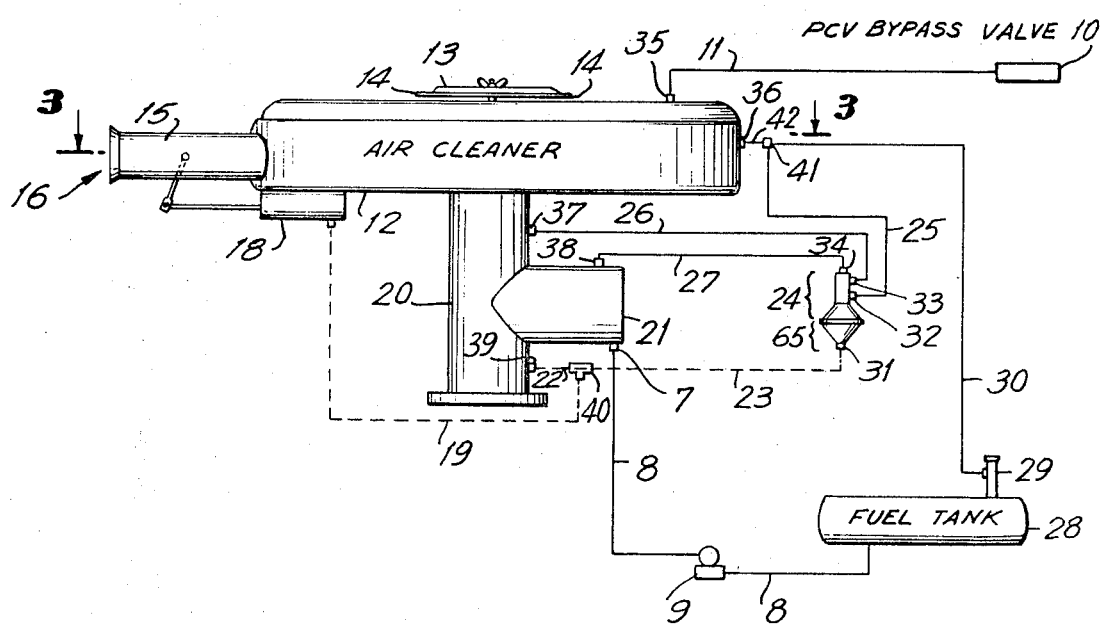
FIG. 1 is an overall schematic drawing of my invention, showing various conduits and interconnections between appropriate parts of a carburetor, air cleaner housing, positive crankcase ventilation (PCV) bypass valve and a fuel tank.

Referring to FIG. 1, which depicts the preferred embodiment of my invention, there is shown a carburetor 20 with an air cleaner housing 12 mounted thereon. Associated with the carburetor 20 is a carburetor fuel bowl 21. Fuel is supplied to the fuel bowl 21 from the fuel tank 28 by conduit 8, the fuel being pumped from the fuel tank 28 by fuel pump 9. For clarity, I have not shown the float valve means generally employed to control the flow of fuel from this fuel tank 28 to the carburetor fuel bowl 21, since such means are well known to those skilled in the carburetion art.

The air cleaner housing 12, as shown in FIG. 1, is provided with various ports and combustion air inlets. More particularly, the top of the air filter housing 12 in conjunction with a circular cover plate or shroud 13, define a combustion air inlet, hereinafter referred to as the secondary air inlet. On the periphery of the air cleaner housing 12 there is provided a tube 15 which defines another combustion air inlet 16, hereinafter referred to as the primary air inlet.

In the preferred embodiment, as shown in FIG. 1, the air filter housing 12 is also provided with two ports, viz. 35 and 36. Port 35 receives conduit 11 which provides fluid communication means between the air filter housing 12 and the outlet side of the PCV bypass valve. Port 36 receives conduit 42 which provides fluid communication means between the air filter housing 12 and both the fuel tank 28 and the carburetor fuel bowl 21. More specifically, conduit 42 connects port 36 with a tee 41. Through one side of the tee 41 conduit 42 is in fluid communication with the fuel tank 28 by conduit 30 and port 29 on the top of the fuel tank 28. Through the other side of the tee 41 conduit 42 is in fluid communication with the top of the carburetor fuel bowl 21 through conduit 25 which connects with a two-way valve 24 at port 32 and from inlet port 34 on the two-way valve 24 via conduit 27 to port 38 on the carburetor fuel bowl 21. The two-way valve 24 is a vacuum actuated valve, the vacuum actuating signal being provided via conduit 23 which connects two-way valve actuator 68 at 31 to a low pressure section of the carburetor 20.

Within the primary air inlet 16, as defined by tube 15, is a butterfly valve (not shown in FIG. 1) which is operated by the primary air valve actuator 18. The primary air valve actuator 18 is operated by a vacuum signal which is provided via conduit 19 wherein conduit 19 is connected through tee 40 and conduit 22 to the previously mentioned low pressure section of carburetor 20.

Figure 2:
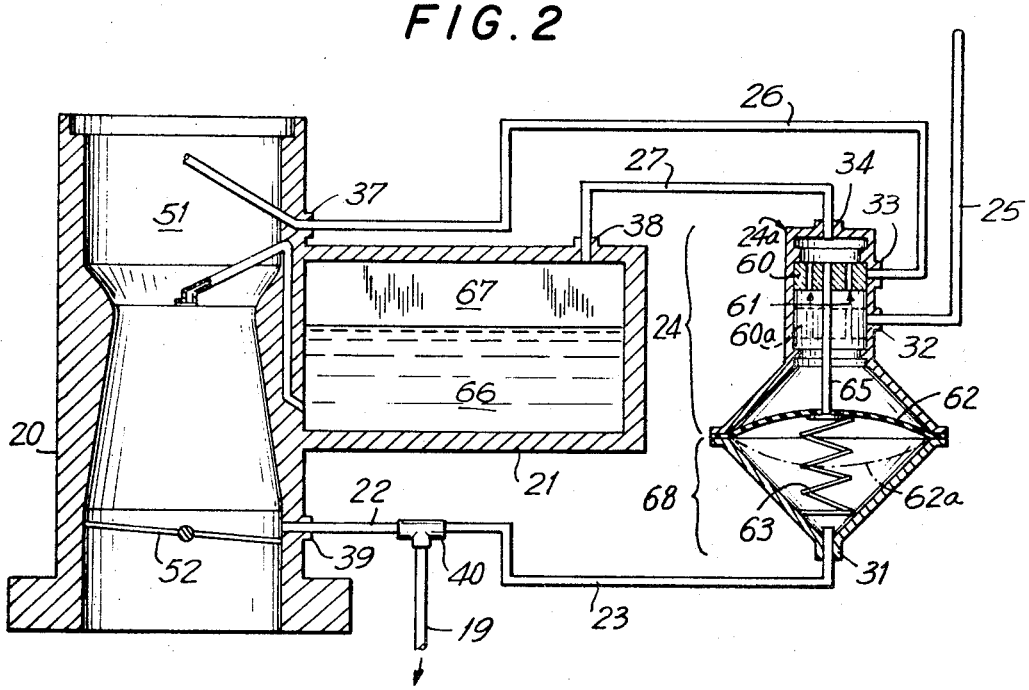
FIG. 2 is a side elevation of the carburetor of FIG. 1 as well as certain components associated therewith, all elements being broken away to show a vertical section thereof.

FIG. 2 shows with more particularity the interconnection and functional interrelation of certain parts of my invention. The particular two-way valve shown in FIG. 2 and generally referred to as 24, has an inlet port 34 and two outlet ports, 32 and 33. The desired two-way valve action is realized by plug 60 sliding within the tube section 24a of the valve actuator 68. Holes 61 are provided in plug 60. The movement of plug 60 is induced by the actuator mechanism generally referred to in FIG. 2 as 68. The actuator is comprised of a diaphragm 62 which is upwardly biased by spring 63, valve stem 65 connecting diaphragm 62 with plug 60. Connected to the lower portion of the actuator at port 31 is conduit 23 which via tee 40 conduit 22 and port 39 on carburetor 20, provides the means by which a vacuum may be induced beneath diaphragm 62.

When there is no induced vacuum beneath diaphragm 62, plug 60 is positioned as shown in FIG. 2, port 33 is blocked, and fluid communication is provided between conduit 27 and conduit 25 via the holes 61 in plug 60. When a vacuum is induced beneath the diaphragm 62, the diaphragm is moved to the position shown by the dotted line representation 62a, causing the slidable plug 60 to move downward to a position indicated by the dotted line representation 60a whereby port 32 is blocked and fluid communication is provided between conduit 27 and conduit 26.

It will be observed that port 39 on carburetor 20, through which the vacuum signal is provided to the valve actuator 65, is located proximate to the throttle valve 52. When the engine is operating at relatively low air consumption, valve 52 is only partially open. As a result, port 39 is not fully exposed to the reduced pressure which exists in the intake manifold, downstream of the throttle 52. However, as the engine air consumption is increased and valve 52 opens further, port 39 is so exposed and, as a consequence, this lower pressure induces a vacuum in the valve actuator 68 beneath the diaphragm 62. Hence, when the engine is not operating or is operating at low air consumption (the term low speed hereinafter including air consumption of zero, i.e. the engine is not operating), the valve plug 60 is in the position shown by the solid line representation and fluid communication is provided between conduits 27 and 25. However, when increased engine air consumption is attained, the low pressure to which port 39 is exposed causes the diaphragm 62 and valve plug 60 to move to the position indicated by the dotted line representation and fluid communication is thereby provided between conduit 27 and 26. It will immediately be appreciated that as a consequence of this operation, at increased engine air consumption internal venting of the carburetor fuel bowl is automatically provided in that the top of the fuel bowl, which is the zone in which evaporated fuel vapors are to be found, is in fluid communication with the throat of the carburetor through port 38 and conduit 27 to valve and thence to the carburetor throat viz. port 33 of valve 24 and conduit 26. During low engine air consumption operation, fuel vapors in the carburetor fuel bowl 21 are vented to conduit 25, which connects with the air filter housing as shown in FIG. 1. From the following comments it will become evident how the fuel vapors are handled within the air filter housing.

The following description refers to both FIGS. 3 and 4 wherein like numbers are used in reference to common elements.

Mounted within the air filter housing 12 is an annular air filter 90, concentrically located with respect to the carburetor air outlet 100. An annular bed of fuel vapor adsorbing material 80, such as activated carbon, is also mounted within the air filter housing 12, outside of, but concentric with respect to, the air filter 90. Further, the external diameter of the air filter 90 and the internal diameter of the adsorption bed 80 are such as to provide, when positioned as described above, an annular space 89 therebetween.

Located within the tube 15, which defines the primary air inlet 16, is a butterfly valve 75, referred to as the primary air valve. Coil spring 76 biases valve 75 to the closed position against stops 78. Positioned on the under part of the air filter housing 12 is the primary air valve actuator 18, which is comprised of cylinder 70 and piston 71. Movement of the piston 71 actuates the primary air valve through the crank arm combination 72 and 74. Piston 71 is caused to move by a partial vacuum which is induced within cylinder 70. This partial vacuum is induced via conduit 19 which is connected through tee 40 and conduit 39 to the reduced pressure zone proximate to the carburetor throttle valve as heretofore described. Moreover, consistent with the above discussion relating to the actuating of valve 24 by this reduced pressure, it will be appreciated that the primary air valve actuator will only be actuated at increased engine air consumption. At lower or decreased engine air consumption rates, the primary air valve actuator is returned to the position shown in FIG. 4 by the coil spring 78. Thus, at low engine air consumption rates, including of course an engine air consumption rate of zero corresponding to the engine being turned off, the primary air valve 75 will be closed. Alternatively, at higher air consumption rates, the primary air valve will be open.

Referring now specifically to FIG. 4, there is provided a shroud 13 which in conjunction with the top plate of the air filter housing 12 defines an inlet 14 hereinafter referred to as the secondary air inlet. Air entering the through the secondary air inlet 14 passes down through the air filter housing 12 to the annular air space 89 between the air filter 90 and the fuel vapor adsorption bed 80. Since the secondary air inlet is always open and the primary air inlet is closed during low air consumption conditions, e.g. idling all the required combustion air at low engine air consumption rates is supplied through the secondary air inlet 14. At high air consumption rates, however, valve 75 opens and combustion air is supplied through both the primary air inlet 16 and the secondary air inlet 14, the two streams joining at the annular space 89.

Referring to FIG. 1, there is provided a port 36 on the periphery of the air cleaner housing 12. Through port 36 and conduit 42 fuel vapors from the fuel tank 28 are inducted into the air cleaner housing 12 and, during low air consumption conditions, fuel vapors from the carburetor fuel bowl 21 are similarly conducted into the air filter housing 12. Returning to FIGS. 3 and 4, there is provided a distribution manifold 81 which may take the form, as shown, of a perforated plate surrounding the annular fuel vapor adsorption bed 80. Distribution manifold 81 is provided to effect a distribution of the fuel vapors, entering the air filter housing through port 36, around the fuel vapor adsorption bed 81 and thereby prevents any localized saturation of the adsorption bed 80.

As may be most clearly seen in FIGS. 1 and 4, located in the top plate of the air filter housing 12 is a port 35 to which conduit 11 is connected. Through conduit 11, blow-by gasses from the PCV bypass valve are introduced into the carburetion system. Because of the location of this point of introduction of these gasses, i.e. because the blow-by gasses are introduced into the secondary air flow, the gasses are cleaned by their travel through the air filter 90 but do not flow through the fuel adsorption bed 80 thus avoiding contamination of the adsorption bed by these partially combusted gasses.

Summarizing the operations hereinbefore described, let it be assumed that the engine to which my invention is connected has been operating for a period of time at relatively high speed, e.g. 20 m.p.h. or faster. During this period, the primary air valve 75 has been open and combustion air to the engine has been supplied through both the primary air inlet 16 and the secondary air inlet 14. Because of the high flow rate through the primary air inlet, all of which must pass through the fuel vapor adsorption bed 80, the material within the bed has been regenerated by the desorption of previously adsorbed fuel vapors. Further, during this regeneration period, the fuel/air ratio has not been significantly disturbed because the primary air flow is very high in relation to the fuel vapor to be desorbed and the rate at which it is desorbed.

During this period of high air consumptions operation, valve 24 is positioned such that internal venting and pressure balance is accomplished between the fuel bowl and the carburetor throat. Fuel vapors arising in the fuel tank 28 are inducted into the air filter housing 12 and mix with the primary air flow. Further, any excess blow-by gasses are vented into the secondary air flow by the PCV bypass valve 10 and conduit 11.

Let it now be assumed that the engine is shut off thus commencing the so-called "hot soak" period. Since the reduced pressure in the intake manifold ceases when the engine is shut off, there will no longer be any vacuum to actuate the vent control valve 24 and the biasing spring 63 in the valve actuator 68 will reposition the plug 60 such that fuel vapors subsequently generated within the carburetor fuel bowl 21 will be vented, along with fuel vapors from the fuel tank 28, to the air filter housing 14 at port 36. Within the air filter housing 14, these vapors are distributed by distribution manifold 81 around the inside of the air filter housing 14. Ultimately, these vapors will pass through the fuel vapor adsorption bed 80 wherein the fuel vapors will be adsorbed thus preventing their emission to the atmosphere. Of course, these vapors are prevented from venting to the atmosphere through the primary air inlet since the primary air inlet valve closes when engine air consumption is reduced.

Later, when the engine is again started and high air consumption operation is commenced, the vent control valve 24 is repositioned for internal venting, the primary air control valve 75 opens and the regeneration process starts all over.

While there has been recited herein a complete description of the preferred embodiment of my invention, numerous alterations of my apparatus or the arrangement of the elements which comprise my invention will immediately be perceived. For example, there are numerous valves known to the art which will provide the two-valve action required of the vent control valve. Alternatively, without departing from the scope of my invention, it will be evident that numerous rearrangements of the fuel vapor adsorption bed, both in terms of shape and position, are possible. Any of these alternatives, all of which are within the compass of the skilled art worker, are within the scope of the appended claims.

I claim:
1. In combination with an internal combustion engine and a carburetor with a fuel bowl, an evaporative emission control system which comprises:
  a. means defining a primary combustion air inlet to said carburetor;
  b. a first valve means in said primary air inlet;
  c. a first valve actuating means, operatively connected to said first valve means and including:
    i. means biasing said first valve means to the closed position; and
    ii. means for opening said first valve means against said biasing means when the engine air consumption is greater than the engine air consumption at idling;
  d. a fuel vapor adsorbent bed in said primary air inlet, downstream of said first valve means;
  e. means defining a secondary combustion air inlet to said carburetor which is always open and is downstream of said fuel vapor adsorbent bed; and
  f. means providing fluid communication from said carburetor fuel bowl to said primary combustion air inlet at a point intermediate said first valve means and said adsorbent bed.

2. In combination with an internal combustion engine and a carburetor with a fuel bowl and an internal vent, an evaporative emission control system which comprises:
  a. means defining a primary combustion air inlet to said carburetor;
  b. a first valve means in said primary air inlet;
  c. a first valve actuating means, operatively connected to said first valve means and including:
    i. means biasing said first valve means to the closed position; and ii. means for opening said first valve means against said biasing means when the engine air consumption is greater than the engine air consumption at idling;
d. a fuel vapor adsorbent bed in said primary air inlet, downstream of said first valve means;
e. means defining a secondary combustion air inlet to said carburetor which is always open and is downstream of said fuel vapor adsorbent bed;
f. means providing fluid communication from said carburetor fuel bowl to said primary combustion air inlet at a point intermediate said first valve means and said adsorbent bed;
g. means providing fluid communication from said carburetor fuel bowl to said internal vent on said carburetor;
h. means for interrupting said fluid communication means from said carburetor fuel bowl to said internal vent on said carburetor when the engine is idling; and
i. means for interrupting said fluid communication means from said carburetor fuel bowl to said primary combustion air inlet when the engine air consumption is greater than the engine air consumption at idling.

3. The system of claim 2 which further comprises:
a. a fuel tank; and
b. means providing fluid communication from said fuel tank to said primary combustion air inlet at a point intermediate said first valve means and said fuel vapor adsorbent bed.

4. The system of claim 3 wherein the adsorbent in said fuel vapor adsorbent bed is activated carbon.

5. In combination with an internal combustion engine and a carburetor with a fuel bowl and an internal vent, an evaporative emission control system which comprises:
a. means defining a primary combustion air inlet to said carburetor;
b. a first valve means in said primary air inlet;
c. a first valve actuating means, operatively connected to said first valve means and including:
  i. means biasing said first valve means to the closed position; and
  ii. means for opening said first valve means against said biasing means when the engine air consumption is greater than the engine air consumption at idling;
d. a fuel vapor adsorbent bed in said primary air inlet, downstream of said first valve means;
e. means defining a secondary combustion air inlet to said carburetor which is always open and is downstream of said fuel vapor adsorbent bed;
f. a second valve means;
g. a conduit from said carburetor fuel bowl to said second valve means;
h. a first conduit from said second valve means to said internal vent on said carburetor;
i. a second conduit from said second valve means to said primary air inlet at a point intermediate said first valve means and said fuel vapor adsorbent bed; and
j. a second valve actuating means, operatively connected to said second valve means, including:
  i. means biasing said second valve means to the closed position with respect to said first conduit and to the open position with respect to said second conduit; and
  ii. means for opening said second valve means with respect to said second conduit and closing said second valve means with respect to said first conduit, against said biasing means, when the engine air consumption is greater than the engine air consumption at idling.

6. the system of claim 5 which further comprises:
a. a fuel tank; and
b. means providing fluid communication from said fuel tank to said primary combustion air inlet at a point intermediate said first valve means and said fuel vapor adsorbent bed.

7. The system of claim 6 wherein said second valve means is a two-way valve.

8. The system of claim 7 wherein said first and secondary actuating means are spring biased vacuum operated actuators.

9. The system of claim 8 which further comprises:
a. a positive crank case ventilation bypass valve; and
b. fluid communication means from the outlet of said positive crankcase ventilation bypass valve to said secondary combustion air inlet.

10. The system of claim 9 which further comprises an air filter downstream of the juncture of the air flow paths provided by said secondary and primary air flow inlets.

11. The system of claim 10 where the adsorbent in said fuel vapor adsorbent bed is activated carbon.

12. In combination with an internal combustion engine and a carburetor with a fuel bowl and an internal vent, an operative emission control system which comprises:
a. an air filter housing, mounted on said carburetor, having:
  i. means defining a combustion air outlet axially aligned with the combustion air inlet of said carburetor;
  ii. means defining a primary combustion air inlet on the periphery of said air filter housing; and
  iii. means defining a secondary combustion air inlet in the form of an annulus concentric with respect to the combustion air outlet of said air filter housing;
b. a first valve means in said primary air inlet;
c. a first valve actuating means, operatively connected to said first valve means and including:
  i. means biasing said first valve means to the closed position; and
  ii. means for opening said first valve means against said biasing means when the engine air consumption is greater than the engine air consumption at idling;
d. an annular fuel vapor adsorbent bed, within said air filter housing, concentric about the combustion air outlet of said air filter housing and having an internal diameter greater than the external diameter of said annular secondary combustion air inlet;
e. an annular air filter, within said air filter housing concentric about the combustion air outlet of said air filter housing and having an external diameter less than the internal diameter of said secondary combustion air inlet;
f. a two-way valve;
g. a conduit from said carburetor fuel bowl to the inlet of said two-way valve;
h. a conduit from the first outlet of said two-way valve to said internal vent of said carburetor;
i. a conduit from the second outlet of said two-way valve to a point on the periphery of said air filter housing; and
j. a second valve actuating means, operatively connected to said two-way valve and including:
  i. means biasing said second valve means to the closed position with respect to said first conduit and to the open position with respect to said second conduit; and
  ii. means for opening said second valve means with respect to said second conduit and closing said second valve means with respect to said first conduit, against said biasing means, when the engine air consumption is greater than the engine air consumption at idling.

13. The system of claim 12 which further comprises:
a. a fuel tank; and
b. a conduit from said fuel tank to the periphery of said air filter housing.

14. The system of claim 13 where the adsorbent in said annular fuel vapor adsorbent bed is activated carbon.

15. The system of claim 14 wherein a fuel distribution manifold is disposed around said annular fuel vapor adsorbent bed.